United States Patent Office 2,739,985
Patented Mar. 27, 1956

2,739,985

CATALYTIC REDUCTION OF NITROBENZENE BY AMMONIA

Melvin L. Huber, Pitman, and William E. Kirst, Woodbury, N. J., assignors to E. I. du Pont de Nemours and Company, Wilmington, Del., a corporation of Delaware No Drawing. Application November 12, 1952, Serial No. 320,146

10 Claims. (Cl. 260—580)

The present invention relates to the manufacture of aniline. More particularly, the present invention provides a process for the preparation of aniline by the catalytic reduction of nitrobenzene with ammonia.

Aniline is a product of great commercial importance, being used extensively in the dye and rubber industries, for organic synthesis, and in many other fields. Aniline has been commercially produced primarily by the liquid phase reduction of nitrobenzene to aniline by means of iron borings and water in the presence of an acidic catalyst. An alternative process has been a vapor-phase hydrogenation of nitrobenzene with hydrogen or water gas over catalysts. The former process has proved to be cumbersome because of the necessity of removing aniline from the iron oxide sludge, and the limited utility of the sludge has reduced the economy of the process. The vapor-phase process, while eliminating the sludge problem, requires a preliminary production of hydrogen by cracking hydrogen-containing materials, such as methanol or hydrocarbons, for example, thereby increasing equipment requirements and process steps.

In the production of aniline by a vapor-phase process, a considerable amount of nitrobenzene passes through the reaction zone unchanged, and is present in the final product. Due to the physical similarities of nitrobenzene and aniline, the separation is difficult and expensive.

It is, accordingly, an object of the present invention to provide an improved process for the production of aniline utilizing readily available raw materials. A further object of the present invention is to provide a process for the preparation of aniline characterized by the absence of solid residue and a minimum amount of unreacted nitrobenzene. Additional objects will become apparent as this invention is further described.

We have found that the foregoing objects are attained when we pass a mixture of vaporized nitrobenzene and ammonia over an activated hydrogenation catalyst heated to a temperature between 250° C. and 400° C., the mixed vapors being in contact with the catalyst for from 0.1 to 6 seconds. In order to obtain substantially complete utilization of the nitrobenzene, an excess molar proportion of ammonia is used, the number of moles of ammonia per mole of nitrobenzene being from 5 to 200.

In carrying out the present process, nitrobenzene is preheated to its vaporization temperature in the presence of ammonia, and the mixture passed through the catalyst chamber, the catalyst having been previously activated with hydrogen and heated to the selected temperature. During the passage over the catalyst bed, the nitrobenzene is converted to aniline, and after leaving the catalyst bed, the vapors are passed through a cold trap. The uncondensed material contains the unreacted ammonia, which can readily be recovered, while the condensate contains the aniline, which is separated by simple extraction.

The process of the present invention is more fully described by reference to the following examples, which are presented for purposes of illustration only, the invention not being limited thereto.

Example 1

In a catalyst chamber, 40 cubic centimeters of a nickel chromite catalyst (8 to 14 mesh) was activated at 450° C. with hydrogen at a velocity of 16,000 cubic centimeters of hydrogen per hour. After activation and while the temperature of the catalyst chamber was controlled at 300° C., ammonia was passed through a heated mixing chamber and then through the catalyst chamber at the rate of 1.47 moles per hour. Nitrobenzene was introduced drop-wise at the rate of 0.08 mole per hour into the heated mixing chamber, where it vaporized and was mixed into the stream of ammonia. After passing through the catalyst chamber, the vapors were cooled in a cold trap, and the condensate collected. The gases contained primarily unreacted ammonia, nitrogen, water-vapor and a small amount of benzene. The condensate contained primarily aniline, water and benzene. After simple extraction and distillation, the crude product contained 99.1% aniline and only 0.03% unreacted nitrobenzene. Based on the nitrobenzene introduced into the process, the yield of aniline was 91%. Analysis of the off-gases showed that about 98% of the available hydrogen of the ammonia consumed had been utilized.

Example 2

Following the procedure set forth in Example 1, and utilizing the catalysts indicated under the conditions specified, the following results were obtained:

| Catalyst | Moles $NH_3$ per Mole $C_6H_5NO_2$ | Control Temp. | Contact Time (sec.) | Percent Util. of $C_6H_5NO_2$ | Percent Yield $C_6H_5NH_2$ |
|---|---|---|---|---|---|
| Nickel on Alumina | 29 | 250 | 1.9 | 99+ | 73 |
| Nickel Molybdite | 14.2 | 350 | 1.7 | 99+ | 84 |
| Nickel-Iron Chromite | 37.5 | 300 | 1.9 | 99+ | 83 |
| Nickel-Cadmium Chromite | 31.5 | 350 | 1.9 | 99+ | 78 |
| Copper-Barium Chromite | 13.5 | 350 | 4.1 | 99+ | 97 |
| Copper-Zinc Chromite | 13.5 | 350 | 4.1 | 99+ | 96 |
| Copper-Magnesium Chromite | 13 | 350 | 4.1 | 99+ | 88 |
| Copper Oxide-Zinc Oxide | 15 | 350 | 4.1 | 99+ | 90 |
| Copper Molybdite | 15 | 375 | 1.8 | 99+ | 94 |
| Cobalt Molybdite | 32 | 400 | 1.8 | 99+ | 96 |

The process of the present invention is operated generally at atmospheric pressure. Because of the exothermic nature of the reaction, that portion of the catalyst in which the conversion begins will attain a temperature as much as 100° C. higher than the temperature of the entire catalyst mass. While the "hot-spot" temperature is actually a more accurate measure of the reaction temperature, the control temperature is simpler to determine and regulate. Therefore, throughout this description, the figures given refer to the temperatures at which the catalyst body as a whole is maintained rather than the actual reaction temperature for the conversion of nitrobenzene to aniline.

The rate at which the nitrobenzene-ammonia mixture is passed through the catalyst is critical, and is defined herein as the contact time. This contact time is determined by the size of the catalyst body and the space velocity of the gasses. Generally, the liquid nitrobenzene is introduced into the heated mixing chamber at a rate to provide 0.1 to 0.25 volumes of nitrobenzene (measured as a liquid) per unit volume of catalyst per hour. A relatively short contact time is desirable in order to prevent decomposition of the products, such as deamination of the aniline. A contact time of from 0.1 to 6 seconds is operable, the preferred range being from 1 to 4 seconds.

The rate of flow of the ammonia is adjusted to provide a considerable excess over the theoretical amount required for the reduction of the nitrobenzene. The molar ratio of ammonia to nitrobenzene may be varied between 5 to 1 and 200 to 1, the preferred range being between 10 to 1 and 50 to 1. The excess ammonia is readily recovered for reuse, and the amount of unreacted nitrobenzene in the product is so slight as to be negligible, being less than 0.5%.

The present invention has been fully described in the foregoing, with reference to specific embodiments. It will be apparent that many variations can be made without departure from the scope of the present invention. Therefore, we intend to be limited only by the following claims.

We claim:

1. A process for the production of aniline by the catalytic vapor-phase reduction of nitrobenzene which comprises passing a mixture of ammonia and vaporized nitrobenzene wherein an excess molar proportion of ammonia is present over an activated hydrogenation catalyst selected from the group consisting of nickel and copper and their chromites and molybdites, and maintained at a temperature between 250° and 400° C. at such rate that the contact time of the mixture and catalyst is from 0.1 to 6 seconds.

2. A process for the production of aniline by the catalytic vapor-phase reduction of nitrobenzene which comprises forming a mixture of vaporized nitrobenzene and ammonia wherein the molar ratio of the ammonia to the nitrobenzene is between 5 to 1 and 200 to 1, and passing said mixture over an activated hydrogenation catalyst selected from the group consisting of nickel and copper and their chromites and molybdites, and maintained at a temperature between 250° and 400° C. at such a rate that the contact time of the mixture and catalyst is from 0.1 to 6 seconds.

3. A process as claimed in claim 2, wherein the molar ratio of ammonia to nitrobenzene is between 10 to 1 and 50 to 1.

4. A process as claimed in claim 2, wherein the contact time of the mixture with the catalyst is from 1 to 4 seconds.

5. A process for the production of aniline by the catalytic vapor-phase reduction of nitrobenzene which comprises forming a mixture of ammonia and vaporized nitrobenzene, the molar proportions of ammonia to nitrobenzene being from 10 to 50 moles of ammonia per mole of nitrobenzene, passing said mixture over an activated hydrogenation catalyst selected from the group consisting of nickel and copper and their chromites and molybdites, and maintained at a temperature from 250° to 400° C. at such rate that the contact time of the mixture and catalyst is from 1 to 4 seconds, and thereafter cooling the reaction products to separate the aniline formed thereby.

6. A process as claimed in claim 5, wherein the catalyst is nickel chromite.

7. A process as claimed in claim 5, wherein the catalyst is nickel molybdite.

8. A process as claimed in claim 5, wherein the catalyst is copper molybdite.

9. A process as claimed in claim 5, wherein the catalyst is copper-magnesium chromite.

10. A process as claimed in claim 5, wherein the catalyst is copper oxide-zinc oxide.

References Cited in the file of this patent

Chem. Abst., vol. 32, col. 2414$^8$ (1938).
Karrer: "Org. Chem." Elsevier, New York, 2nd Eng. ed. (1946) p. 402.
Sidgwick: "Org. Chem. of Nitrogen" edited by Taylor et al., Oxford Press London (1942) page 252.